(12) United States Patent
Jiang et al.

(10) Patent No.: US 8,271,052 B2
(45) Date of Patent: Sep. 18, 2012

(54) ELECTRONIC DEVICE

(75) Inventors: Bin Jiang, Shenzhen (CN); Man-Zhong Wang, Shenzhen (CN); Te-Hua Lee, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 125 days.

(21) Appl. No.: 12/796,530

(22) Filed: Jun. 8, 2010

(65) Prior Publication Data

US 2011/0151945 A1 Jun. 23, 2011

(30) Foreign Application Priority Data

Dec. 22, 2009 (CN) .......................... 2009 1 0312007

(51) Int. Cl.
*H04M 1/00* (2006.01)
*H04B 1/38* (2006.01)

(52) U.S. Cl. ..................... 455/572; 455/573; 455/575.1; 455/575.8

(58) Field of Classification Search ................... 455/572, 455/573, 575.1, 575.8
See application file for complete search history.

(56) References Cited

U.S. PATENT DOCUMENTS

| | | | |
|---|---|---|---|
| 7,801,577 B2* | 9/2010 | Lee | 455/575.1 |
| 2003/0224834 A1* | 12/2003 | Yeh | 455/572 |
| 2008/0161069 A1* | 7/2008 | Hankui | 455/572 |
| 2009/0170577 A1* | 7/2009 | Liu | 455/575.8 |
| 2009/0270140 A1* | 10/2009 | Takahashi | 455/575.1 |
| 2010/0159337 A1* | 6/2010 | Matsumoto et al. | 429/337 |

* cited by examiner

*Primary Examiner* — Wen Huang
(74) *Attorney, Agent, or Firm* — Altis Law Group, Inc.

(57) ABSTRACT

An electronic device comprises an upper housing, a lower housing, and a battery. The lower housing is engaged with the upper housing. A bottom wall of the lower housing is partially recessed to form a thin battery receiving portion. The thin battery receiving portion can give way to pressure caused by a swelling and or exploding battery.

9 Claims, 2 Drawing Sheets

ELECTRONIC DEVICE

BACKGROUND

1. Technical Field

The present disclosure relates to electronic devices, and particularly to an electronic device with a battery.

2. Description of Related Art

Most cell phone often depends on a lithium-ion battery to power it. Nowadays, although safety properties of the lithium-ion battery have greatly improved, when the lithium-ion battery is improperly overcharged or short circuited, the battery may explode.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
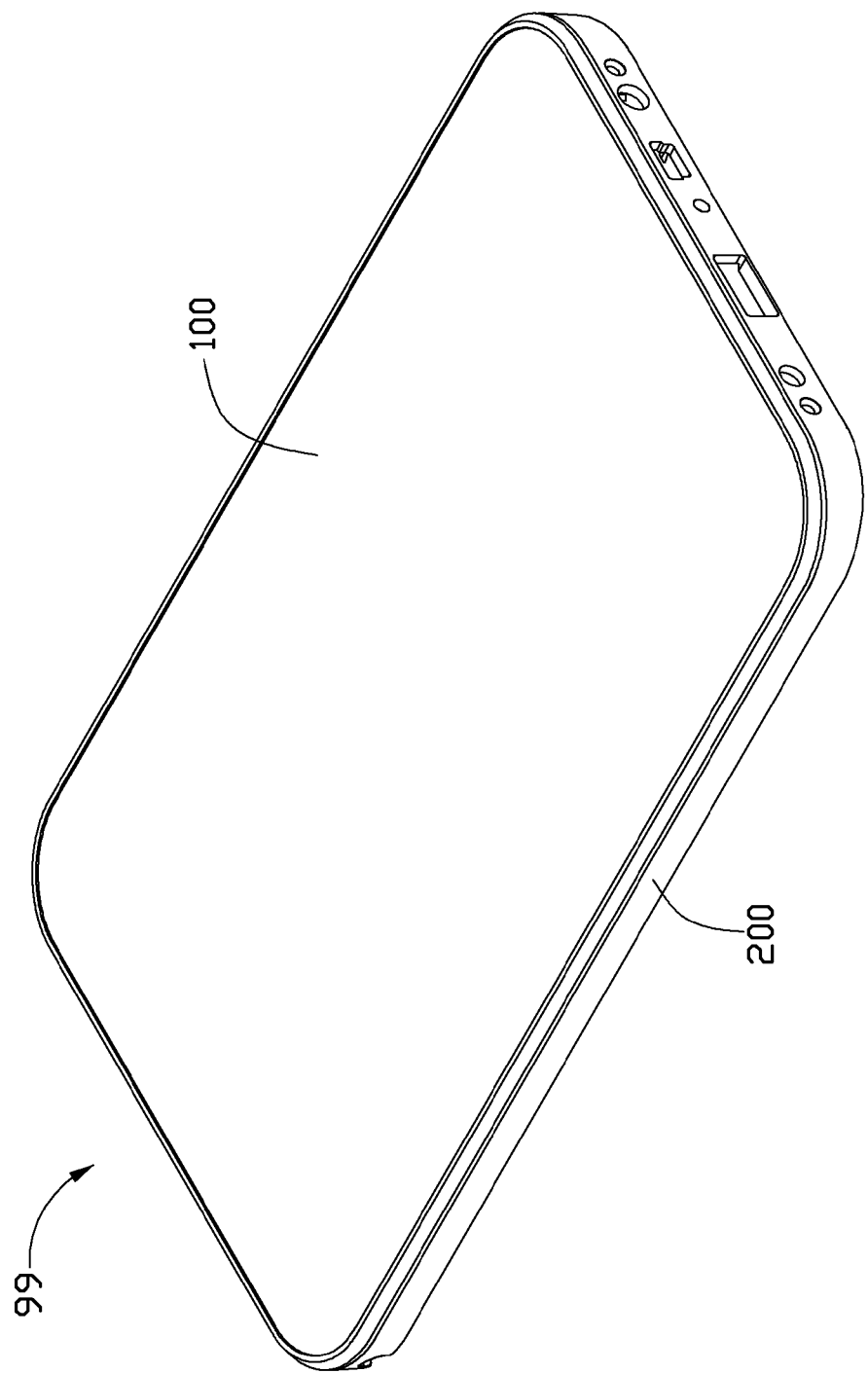
FIG. 1 is a perspective view of an electronic device in accordance with an exemplary embodiment.
Figure 2:
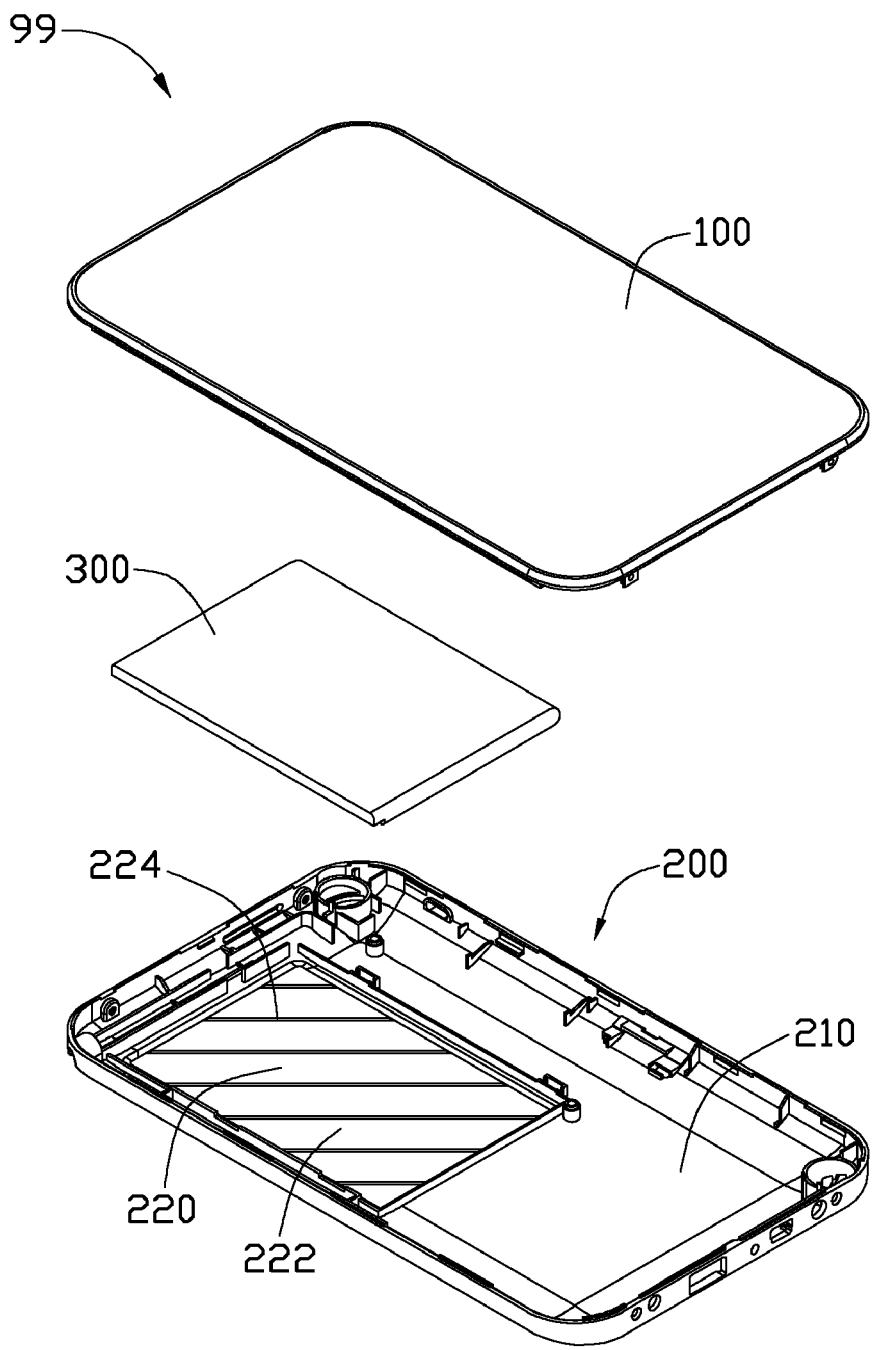
FIG. 2 is an exploded view of the electronic device of FIG. 1.

Referring to FIGS. 1 and 2, an electronic device 99 includes an upper housing 100, a lower housing 200 engaged with the upper housing 100, and a battery 300 received in a receiving space formed by the upper housing 100 combining with the lower housing 200. The electronic device 99 may be a cell phone. The battery 300 may be a lithium-ion battery.

A portion of the bottom wall 210 of the lower housing 200 which forms a battery receiving portion 220 is made thinner relative to the rest of the bottom wall 210. The thin structure of the battery receiving portion 220 can serve as a break-away portion should the battery 300 swell or explode helping to direct the blast in a direction more easily avoided by a user.

The bottom 222 of the battery receiving portion 220 defines a plurality of slots 224, and the slots 224 are parallel with each other.

In use, if the battery 300 of the electronic device 99 swells and is in danger of exploding, a user can be warned by the swelling of the thin battery receiving portion 220. This should give users time enough to drop the electronic device 99 and get away from the electronic device 99.

In addition, if the battery 300 overheats and swells, the slots 224 of the lower housing 200 may split open and release pressure, which could help lessen the effects of an explosion, and further alert users.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device, comprising:
   an upper housing;
   a battery; and
   a lower housing engaged with the upper housing, a portion of the bottom wall of the lower housing which forms a battery receiving portion is made thinner relative to the rest of the bottom wall;
   wherein the bottom of the battery receiving portion defines a plurality of slots for splitting open to release pressure when the battery overheats.

2. The electronic device according to claim 1, wherein the plurality of slots are parallel with each other.

3. The electronic device according to claim 1, wherein the electronic device is a cell phone.

4. The electronic device according to claim 1, wherein the battery is a lithium-ion battery.

5. An electronic device, comprising:
   an upper housing;
   a lower housing engaged with the upper housing to form a receiving space, a bottom wall of the lower housing defining a plurality of slots for splitting open to release pressure when the battery overheats; and
   a battery received in the receiving space.

6. The electronic device according to claim 5, wherein a portion of the bottom wall of the lower housing forms a battery receiving portion for receiving the battery which is made thinner relative to the rest of the bottom wall, the plurality of slots are defined in the bottom of the battery receiving portion.

7. The electronic device according to claim 5, wherein the plurality of slots are parallel with each other.

8. The electronic device according to claim 5, wherein the electronic device is a cell phone.

9. The electronic device according to claim 5, wherein the battery is a lithium-ion battery.

\* \* \* \* \*